US008593344B2

(12) United States Patent
Farmer et al.

(10) Patent No.: US 8,593,344 B2
(45) Date of Patent: Nov. 26, 2013

(54) METHODS AND APPARATUSES FOR REQUESTING/PROVIDING CODE PHASE RELATED INFORMATION ASSOCIATED WITH VARIOUS SATELLITE POSITIONING SYSTEMS IN WIRELESS COMMUNICATION NETWORKS

(75) Inventors: Dominic Gerard Farmer, Los Gatos, CA (US); Ie-Hong Lin, Cupertino, CA (US); Stephen W. Edge, Escondido, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/538,072

(22) Filed: Jun. 29, 2012

(65) Prior Publication Data

US 2012/0268323 A1    Oct. 25, 2012

Related U.S. Application Data

(63) Continuation of application No. 12/480,499, filed on Jun. 8, 2009, now Pat. No. 8,237,610.

(60) Provisional application No. 61/061,229, filed on Jun. 13, 2008.

(51) Int. Cl.
*G01S 19/30* (2010.01)
(52) U.S. Cl.
USPC .................................................. 342/357.69
(58) Field of Classification Search
USPC ............... 342/357.4, 357.46, 357.52, 357.69; 701/468, 412, 470
See application file for complete search history.

(56) References Cited

U.S. PATENT DOCUMENTS

| 5,343,210 | A | 8/1994 | Marcuard |
|---|---|---|---|
| 5,825,887 | A | 10/1998 | Lennen |
| 6,300,899 | B1 | 10/2001 | King |
| 7,421,342 | B2 | 9/2008 | Churan |
| 7,683,831 | B2 | 3/2010 | Fischer |
| 8,237,610 | B2 | 8/2012 | Farmer et al. |
| 2003/0081660 | A1 | 5/2003 | King et al. |
| 2005/0031016 | A1 | 2/2005 | Rosen |
| 2006/0198428 | A1 | 9/2006 | Alanen |
| 2012/0264453 | A1 | 10/2012 | Farmer et al. |

FOREIGN PATENT DOCUMENTS

| CN | 1323991 A | 11/2001 |
|---|---|---|
| CN | 101133563 A | 2/2008 |
| EP | 1152255 A2 | 11/2001 |
| RU | 2233045 C2 | 7/2004 |

OTHER PUBLICATIONS

3GPP2 C.S0022, Version 3.0, 3rd Generation Partnership Project 2 "3GPP2", Position Determination Service Standard for Dual Mode Spread Spectrum Systems, Feb. 16, 2001, www.3gpp2.org.
3GPP2 C.S0022-0, Version 1.0, (TIA:IS-801), Location Services (Position Determination Service), Dec. 1999.
3GPP2 C.S0022-A ., Version 1,0, Mar. 2004, 3rd Generation Partnership Project 2 3C_:PP2: Position Determination Service for cdma2000 Spread Spectrum Systems.
International Search Report and Written Opinion—PCT/US2009/047270, International Search Authority—European Patent Office—Sep. 11, 2009.
Taiwan Search Report—TW098119824—TIPO—Aug. 24, 2012.

*Primary Examiner* — Dao Phan
(74) *Attorney, Agent, or Firm* — Thien T. Nguyen

(57) ABSTRACT

Methods and apparatuses are provided that may be used by one or more devices within in wireless communication network to request and/or provide code phase related information signals associated with various Satellite Positioning Systems (SPSs).

40 Claims, 4 Drawing Sheets

METHODS AND APPARATUSES FOR REQUESTING/PROVIDING CODE PHASE RELATED INFORMATION ASSOCIATED WITH VARIOUS SATELLITE POSITIONING SYSTEMS IN WIRELESS COMMUNICATION NETWORKS

CROSS REFERENCE TO RELATED APPLICATIONS

This application is a continuation of co-pending U.S. patent application Ser. No. 12/480,499, entitled "Methods and Apparatuses For Requesting/Providing Code Phase Related Information Associated with Various Satellite Positioning Systems in Wireless Communication Networks," filed Jun. 8, 2009, which claims priority to Provisional Patent Application No. 61/061,229, entitled "Generic Code Phase Encoding for GNSS System," filed Jun. 13, 2008, the complete disclosures of both of which are expressly incorporated in their entirety by reference herein.

BACKGROUND

1. Field

The subject matter disclosed herein relates to wireless communication networks and devices and more particularly to methods and apparatuses for use by devices within a wireless communication network to request and/or provide code phase related information associated with various Satellite Positioning Systems (SPSs).

2. Information

Position determination processes may be used to estimate or otherwise determine a location of a device associated with a wireless communication network. In a particular example, a position determination process may be implemented to estimate location coordinates for a mobile device such as a cellular telephone or other like mobile station. There are a variety of techniques available to support position determination processes. For example, a Satellite Positioning System (SPS) such as the Global Positioning System (GPS) and/or other like systems may be used to estimate the location of a mobile station. In the context of a wireless communication network, certain position determination processes may require that information and/or processing tasks be shared and/or distributed between and/or among multiple devices. For example, in certain instances a mobile station may be assisted in some manner by one or more other devices as part of a position determination process. As a result, there is often a need for such devices to communicate in some manner, for example, via one or more position determination communication sessions over a wireless link. Thus, one or more positioning protocols may be developed to enable such position determination communication sessions and as such support position determination processes.

SUMMARY

In accordance with certain aspects, certain example methods and apparatuses are provided for use in one or more devices within a wireless communication network to request and/or provide code phase related information associated with various Satellite Positioning Systems (SPSs).

By way of example, a method may be implemented which includes establishing a code phase origin reference value this may be based, at least in part, on one or more position determination information signals representing a plurality of code phase values associated with at least one SPS. The method may further include establishing a plurality of encoded code phase values that correspond to the plurality of code phase values, wherein each of the plurality of encoded code phase values is associated with the code phase origin reference value. The method may also include transmitting at least one message that includes signals representing the plurality of encoded code phase values and identifying the code phase origin reference value.

In certain example implementations, at least a portion of the plurality of code phase values may be associated with different reference time values. In certain example implementations, the code phase origin reference value may be independent of the different reference time values. In certain example implementations, the code phase origin reference value may include an average of the plurality of code phase values.

In certain example implementations, the encoded code phase values may include acquisition assistance information and the transmitted message may be sent by a location server to a mobile station. In certain other example implementations, the encoded code phase values may include pseudorange measurement information and the transmitted message may be sent by a mobile station to a location server.

In certain example implementations, the SPS may include one or more Global Navigation Satellite Systems (GNSSs) and the transmitted message may identify the GNSS and at least one GNSS resource associated with at least one of the encoded code phase values. For example, in certain implementations, a GNSS resource may include a GPS resource, an SBAS resource, a QZSS resource, a GLONASS resource, a Galileo resource, a Compass/BeiDou resource, and/or the like. The GNSS resource may be associated with at least one of a GNSS signal, a GNSS signal band, a space vehicle (SV), and/or the like, for example.

In accordance with yet another aspect, a method may be provided which includes receiving at least one message having signals representing a plurality of encoded code phase values associated with one or more SPS and identifying a code phase origin reference value. The method may also include establishing a plurality of code phase values that correspond to the plurality of encoded code phase values based, at least in part, on the plurality of encoded code phase values and the code phase origin reference value.

In certain example implementations, the received message may identify a reference time value with which the plurality of code phase values may be based, at least in part, along with the encoded code phase values and the code phase origin reference value.

In certain example implementations, each of the code phase values may be established by subtracting the code phase origin reference value and a corresponding encoded code phase value from a reference time value. In some example implementations, the reference time value may be associated with a local time value.

In certain example implementations, the message may be received by a mobile station from a location server and include acquisition assistance information signals. In certain other implementations, the message may be received by a location server from a mobile station and include pseudorange measurement information signals.

In accordance with certain other aspects, a specific apparatus may be provided for use in a wireless communication network. The specific apparatus may include, for example, at least a signal processor and a transmitter. The signal processor may be operatively enabled to access position determination information signals representing a plurality of code phase values associated with at least one SPS, establish a code phase origin reference value based, at least in part, on the position determination information signals, and establish a plurality of encoded code phase values corresponding to the plurality of code phase values. Here, for example, each of the encoded code phase values may be associated with the code phase origin reference value. The transmitter may be operatively enabled to transmit at least one message that includes one or more signals representing the encoded code phase values and the code phase origin reference value.

In certain example implementations, the specific apparatus may include a location server and the encoded code phase values may include acquisition assistance information for use by a mobile station. In certain other example implementations, the specific apparatus may include a mobile station and the encoded code phase values may include pseudorange measurement information for use by a location server.

In accordance with yet another aspect, a specific apparatus may be provided for use in a wireless communication network. The specific apparatus may include, for example, at least, a receiver and a signal processor. The receiver may be operatively enabled to receive at least one message having signals representing a plurality of encoded code phase values associated with one or more SPS and a code phase origin reference value. The signal processor may be operatively enabled to establish a plurality of code phase values that correspond to the encoded code phase values based, at least in part, on the encoded code phase values and the code phase origin reference value.

In certain example implementations, the specific apparatus may include a mobile station and the received message may include acquisition assistance information signals sent by a location server. In other example implementations, the specific apparatus may include a location server and the received message may include pseudorange measurement information signals sent by a mobile station.

DETAILED DESCRIPTION

Figure 1:
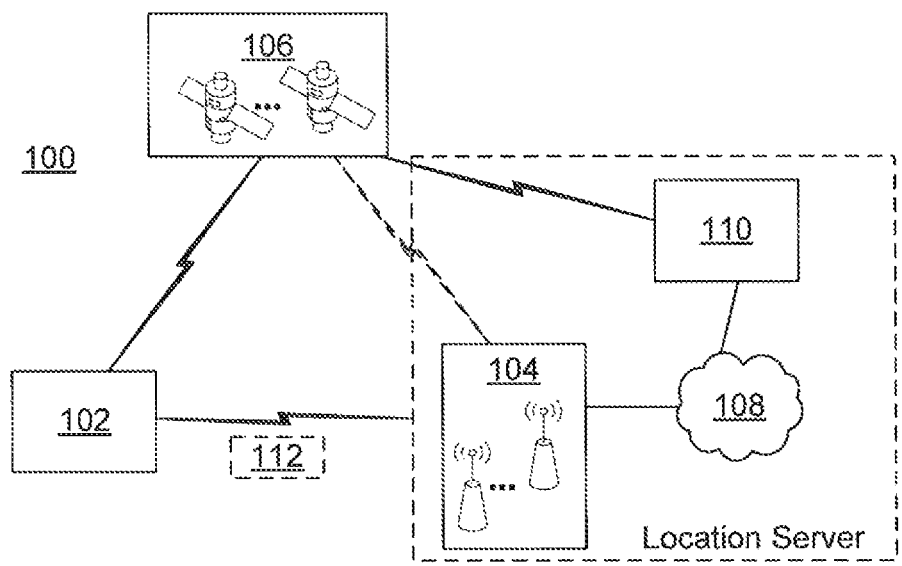
FIG. 1 is a schematic block diagram illustrating an example wireless communication network environment within which at least two devices may communicate with one another and initiate and/or otherwise support a position determination process, in accordance with an implementation.

Non-limiting and non-exhaustive aspects are described with reference to the following figures, wherein like reference numerals refer to like parts throughout the various figures unless otherwise specified.

Position determination processes may be used to estimate or otherwise determine a location of a device and in particular examples the location of a mobile device such as a mobile station. There are a variety of techniques available to support position determination processes. In the context of a wireless communication network, certain position determination processes may require that information and/or processing tasks be distributed between and/or among multiple devices. For example, in certain instances a mobile station may be assisted in some manner by one or more other devices as part of a position determination process. As a result, there may be a need for such devices to communicate in some manner, for example, via one or more communication sessions, e.g., "position determination communication sessions" over a wireless link. One or more positioning protocols may be developed to enable such position determination communication sessions for supporting various position determination processes. Such positioning protocols may provide for code phase related information associated with a Satellite Positioning Systems (SPS), to be shared between devices such as a mobile station and a location server.

Thus, in accordance with certain exemplary aspects, methods and apparatuses may be implemented in a location server, a mobile station, and/or other like device(s) and/or specific apparatuses therein within a wireless communication network to establish, share and/or utilize code phase related information associated with various Satellite Positioning System(s) (SPS(s)) for example, as part of a position determination process.

For example, methods and apparatuses may be implanted in a sending device such that code phase values associated with various different SPS/GNSS resources, some or all of which may be related to different reference time values, are instead associated with a "generic" code phase origin reference value that may be established by the sending device. The resulting encoded code phase values and the code phase origin reference value may then be transmitted in one or more messages to a receiving device along with additional position determination information. A receiving device may then re-establish corresponding code phase values based, at least in part, on a reference time and the received "generic" code phase origin reference value and the encoded code phase values.

By way of example, an exemplary method may be provided for use in a wireless communication network. Such method may be implemented in a location server and/or a mobile station, for example. Such method may include establishing a "generic" code phase origin reference value based, at least in part, on position determination information signals representing a plurality of code phase values associated with at least one SPS. Such a method may also include establishing a plurality of encoded code phase values corresponding to the plurality of code phase values, wherein each of the plurality of encoded code phase values is associated with the "generic" code phase origin reference value. Such a method may also include transmitting at least one message comprising signals representing the plurality of encoded code phase values and identifying the code phase origin reference value.

In certain example implementations, at least a portion of the plurality of code phase values may be associated with one or more, possibly different, reference time values, however the "generic" code phase origin reference value may be established to be independent of these various reference time values. By way of example but not limitation, a "generic" code phase origin reference value may be established as an average and/or other like value as may be determined from the plurality of code phase values.

In certain example implementations, the plurality of encoded code phase values may comprise acquisition assistance information sent by a location server to a mobile station, e.g., within a wireless communication network using at least one Position Determination Data Message (PDDM). In other example implementations, the plurality of encoded code phase values may comprise pseudorange measurement information that may be sent (e.g., in at least one PDDM, or the like) by a mobile station to a location server.

In certain example implementations, the SPS may include at least one Global Navigation Satellite System (GNSS) and the message may identify the GNSS and/or at least one GNSS resource associated with an encoded code phase value. By way of example but not limitation, a GNSS resource may include a GPS resource, an SBAS resource, a QZSS resource, a GLONASS resource, a Galileo resource, a Compass/BeiDou resource, and/or other like resources. By way of example but not limitation, a GNSS resource may be identified as being associated with a particular GNSS signal, a particular GNSS signal band, and/or a particular space vehicle (SV).

By way of further example, another exemplary method may be provided for use in a receiving device within a wireless communication network. Thus, for example, such a method may be implemented in a location server that is enabled to receive pseudorange measurement information signals sent by a mobile station, or in a mobile station that is enabled to receive acquisition assistance information signals sent by a location server. With this in mind, a method may include receiving at least one message comprising signals representing a plurality of encoded code phase values associated with one or more SPS and identifying a "generic" code phase origin reference value. The method may also include establishing (e.g., re-establishing) a plurality of code phase values corresponding to the plurality of encoded code phase values based, at least in part, on the plurality of encoded code phase values and the "generic" code phase origin reference value.

In certain example implementations, such a method may include establishing each of the plurality of code phase values by subtracting the "generic" code phase origin reference value and a corresponding one of the plurality of encoded code phase values from a reference time value. In certain implementations, the reference time value may include a local time value, which may or may not be synchronized with a "system" time (e.g., GNSS, CDMA, or the like).

In certain example implementations, an element within a PDDM may include a request element and/or a provide element that is compliant and/or otherwise operative with Telecommunications Industry Association (TIA) "IS-801-B" positioning protocol standard and/or an associated Third-Generation Partnership Project 2 (3GPP2) positioning protocol standard.

Positioning protocols have been developed and standardized for use in CDMA2000 and High Rate Packet Data (HRPD) wireless communication networks, for example. One example positioning protocol is often referred to by its standardization identity as "IS-801" in the TIA published standards (or "C.S0022" in 3GPP2 published standards). Currently, there are two versions of this example positioning protocol. The first version is the initial version IS-801 version 1 (or C.S0022-0 version 3.0), which will simply be referred to herein as IS-801-1. The second version is IS-801 version A (or C.S0022-A version 1.0), which will simply be referred to herein as IS-801-A. It is expected that some form of IS-801-B will soon be finalized and identified in some manner by TIA and/or 3GPP2 (e.g., perhaps as IS-801 version B (or C.S0022-B version 1.0), and/or other like identifiers).

In accordance with certain aspects of the present description, it is recognized that it may be beneficial to develop more advanced/robust positioning protocol versions, such as, IS-801-B and/or other positioning protocol versions which may support a plurality of different GNSS and/or different types/formats of GNSS code phase related information. Moreover, it is also recognized that positioning protocol version negotiation processes may be employed within wireless networks, as needed, to allow various enabled devices to initiate and establish a position determination communication session over a communication channel/link and through which certain such potentially varying types of code phase related information may be requested and/or provided in an efficient manner.

By way of example but not limitation, certain methods and apparatuses provided herein may use one or more PDDMs which may be provided in one or more transport messages in a manner that not only supports IS-801-B, but also legacy and/or future versions. Further still, certain methods and apparatuses may support position determination processes in a variety of wireless communication networks, such as, e.g., an Ultra Mobile Broadband (UMB) network, a High Rate Packet Data (HRPD) network, a CDMA2000 1X network, and/or the like.

In accordance with certain aspects of the present description, various methods and apparatuses are provided which may be implemented in one or more devices that may support a position determination process. By way of example but not limitation, a device may include a mobile station, or a specific apparatus, such as, a base station, a location server (e.g. a Position Determination Entity (PDE), Serving Mobile Location Center (SMLC), Gateway Mobile Location Center (GMLC), Standalone AGPS SMLC (SAS), SUPL Location Platform (SLP), etc.), and/or the like. For example, in certain implementations a mobile station and base station may be operatively enabled to communicate within a CDMA wireless communication network, and/or other applicable type of wireless communication network.

Methods and apparatuses may be implemented in such devices to allow the devices to utilize a position determination communication session associated with a position determination process. The position determination communication session may utilize a negotiated positioning protocol version, depending on the capabilities of the devices involved. Thus, the methods and apparatuses may be implemented to allow for different positioning protocol versions within a network. The methods and apparatuses may, for example, be enabled to allow for or otherwise support backward and/or forward compatibility between various positioning protocol versions within a network.

In the following detailed description, numerous specific details are set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

Attention is now drawn to FIG. 1, which is a schematic block diagram illustrating an example wireless communication network environment 100 within which devices may communicate with one another and initiate and/or otherwise support a position determination process.

In this particular example, wireless communication network environment 100 includes representative devices such as a mobile station (MS) 102, one or more base station(s) (BS) 104, one or more Satellite Positioning System(s) (SPS) 106, a network 108, and a location server 110. MS 102 may communicate with BS 104 over one or more wireless communication links. One or more of MS 102, BS 104, or location server 110 may acquire SPS signals transmitted by various transmitting resources of SPS 106, and/or otherwise be enabled to support certain position determination processes associated with information available via SPS 106.

Although the representative devices in FIG. 1 are illustrated as being coupled by either wireless communication links or wired communication links, it should be understood that in certain example implementations at least some of the devices may be coupled together via one or more wired, fiber, and/or wireless communication link(s).

Unless specifically stated otherwise, as used herein, the term "location server" is intended to represent one or more devices and/or one or more specific apparatuses therein that is/are enabled to support, at least in part, such position determination processes. Thus, while illustrated as a separate device in the example shown in FIG. 1 that may communicate via network 108 and/or a BS 104 with MS 102, it should be understood that in other implementations a "location server" may communicate directly and/or indirectly with MS 102 using one or more wired and/or one or more wireless communication links. Hence, in certain example implementations, a location server may take the form of and/or otherwise operatively comprise one or more wireless transmitters, receivers, transceivers, one or more base stations, various wired and/or wireless network resources, one or more computing devices enabled as specific apparatuses, and/or other like computing and/or communication devices. With this in mind, where example references are made to a base station (BS) or a BS 104, it should be understood that such BS and/or BS 104 may comprise a "location server" as broadly defined herein. Accordingly, the terms base station (BS) and location server are used interchangeably. Further still, in messages requesting and/or providing BS capabilities, etc., it should be understood that such requested information and/or provided information may be associated with location server capabilities, etc. As illustrated in FIG. 1, MS 102 may share (send/receive) messages 112 (e.g., PDDMs) with (to/from) a location server.

MS 102 and/or BS 104 may provide functionality, for example, through the use of various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Communications (GSM), Digital Advanced Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. As mentioned earlier, the techniques may be implemented for use with a UMB network, a HRPD network, a CDMA2000 1X network, GSM, LTE, and/or the like.

SPS 106 may, for example, include one or more of the Global Positioning System (GPS), a modernized GPS, Galileo, GLONASS, a Satellite Based Augmentation System (SBAS), Quasi-Zenith Satellite System (QZSS), Compass/BeiDou, NAVSTAR, and/or other like GNSS, a system that uses satellites from a combination of these systems, or any SPS developed in the future, each referred to generally herein as a "Satellite Positioning System" (SPS).

Furthermore, the methods and apparatuses described herein may be used with position determination processes that utilize pseudolites or a combination of satellites and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with SPS time. Each such transmitter may be assigned a unique PN code so as to permit identification by a remote receiver. Pseudolites may be used to augment a SPS, for example, in situations where some SPS signals from orbiting satellites might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

MS 102, in certain example implementations, may include a device such as a cellular or other wireless communication device, personal communication system (PCS) device, personal navigation device, a vehicle mountable navigation device, a tracking device, Personal Information Manager (PIM), Personal Digital Assistant (PDA), laptop or other suitable device which may be capable of receiving wireless communications.

The methodologies described herein may be implemented by various means depending upon the application. For example, these methodologies may be implemented in various combinations of hardware, firmware, and/or software. For a hardware implementation, one or more processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or hardware/software implementations, certain methodologies may be implemented with modules (e.g., procedures, functions, and so on) that perform the functions described herein. Any machine readable medium tangibly embodying instructions may be used in implementing the methodologies described herein. For example, software codes may be stored in a memory of MS 102 and/or BS 104 and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in hardware/software, functions that implement methodologies or portions thereof may be stored on and/or transmitted over as one or more instructions or code on a computer-readable medium. A computer-readable medium may take the form of an article of manufacture. A computer-readable medium may include computer storage media and/or communication media including any medium that facilitates transfer of a computer program from one place to another. A storage media may be any available media that may be accessed by a computer or like device. By way of example but not limitation, a computer-readable medium may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

Figure 2:
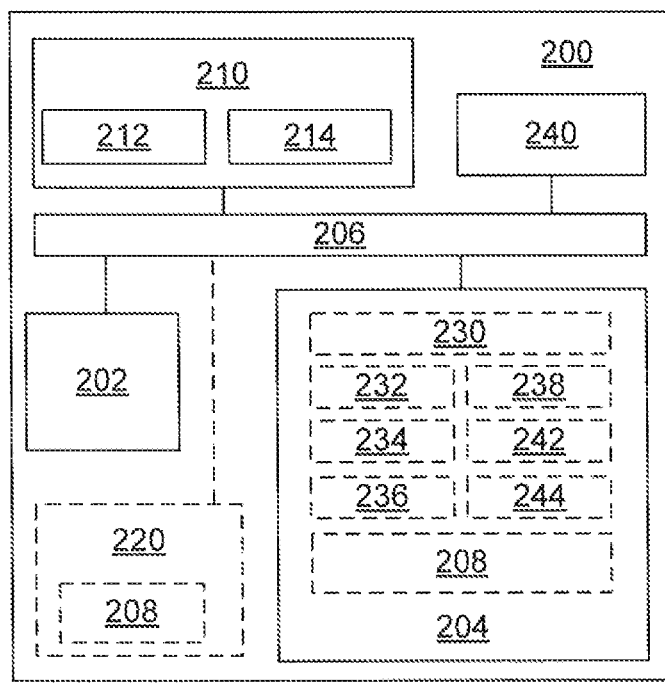
FIG. 2 is a schematic block diagram illustrating certain example features of a device that may initiate and/or otherwise support a position determination process, in accordance with an implementation.

Reference is now made to FIG. 2, which is a schematic block diagram illustrating certain example features of a specific apparatus 200 enabled to initiate and/or otherwise support a position determination process. Apparatus 200 may, for example, be implemented in some form within MS 102, BS 104, location server 110, and/or other like devices, as applicable, to perform or otherwise support at least a portion of the example techniques described herein.

Apparatus 200 may, for example, include one or more processing units 202, memory 204, a transceiver 210 (e.g., wireless network interface), and (as applicable) an SPS receiver 240, which may be operatively coupled with one or more connections 206 (e.g., buses, lines, fibers, links, etc.). In certain example implementations, all or part of apparatus 200 may take the form of a chipset, and/or the like.

Processing unit 202 may be implemented using a combination of hardware and software. Thus, for example, processing unit 202 may represent one or more circuits configurable to perform at least a portion of a data signal computing procedure or process related to the operation of device 200. By way of example but not limitation, processing unit 202 may include one or more processors, controllers, microprocessors, microcontrollers, application specific integrated circuits, digital signal processors, programmable logic devices, field programmable gate arrays, and the like, or any combination thereof.

Memory 204 may represent any data storage mechanism. Memory 204 may include, for example, a primary memory and/or a secondary memory. Primary memory may include, for example, a random access memory, read only memory, etc. While illustrated in this example as being separate from processing unit 202, it should be understood that all or part of a primary memory may be provided within or otherwise co-located/coupled with processing unit 202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, computer readable medium 220. As such, in certain example implementations, the methods and/or apparatuses presented herein may take the form in whole or part of a computer readable medium 220 that may include computer implementable instructions 208 stored thereon, which if executed by at least one processing unit 202 may be operatively enabled to perform all or portions of the example operations as described herein.

As illustrated in FIG. 2, memory 204 may also include instructions and/or information in the form of data signals associated with, for example, a code phase origin reference value 230, various position determination information 232, one or more code phase values 234, one or more encoded code phase values 236, one or more different reference time values 238, various acquisition assistance information 242, various pseudorange measurement information signals 244, and/or other like information.

Figure 3:
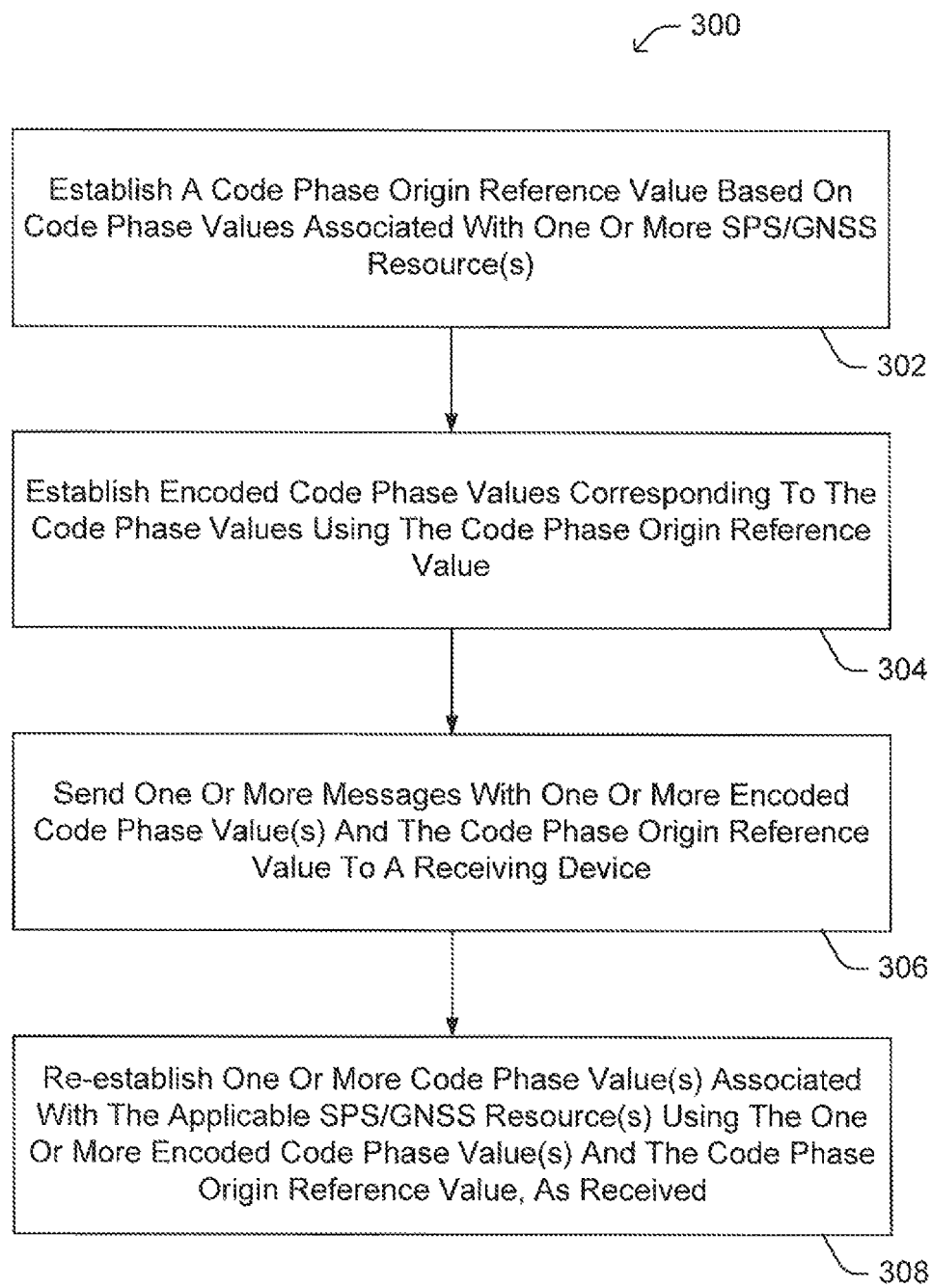
FIG. 3 is a flow-diagram illustrating an exemplary method that may be implemented in one or more devices to initiate and/or otherwise support a position determination process, in accordance with an implementation.
Figure 4:
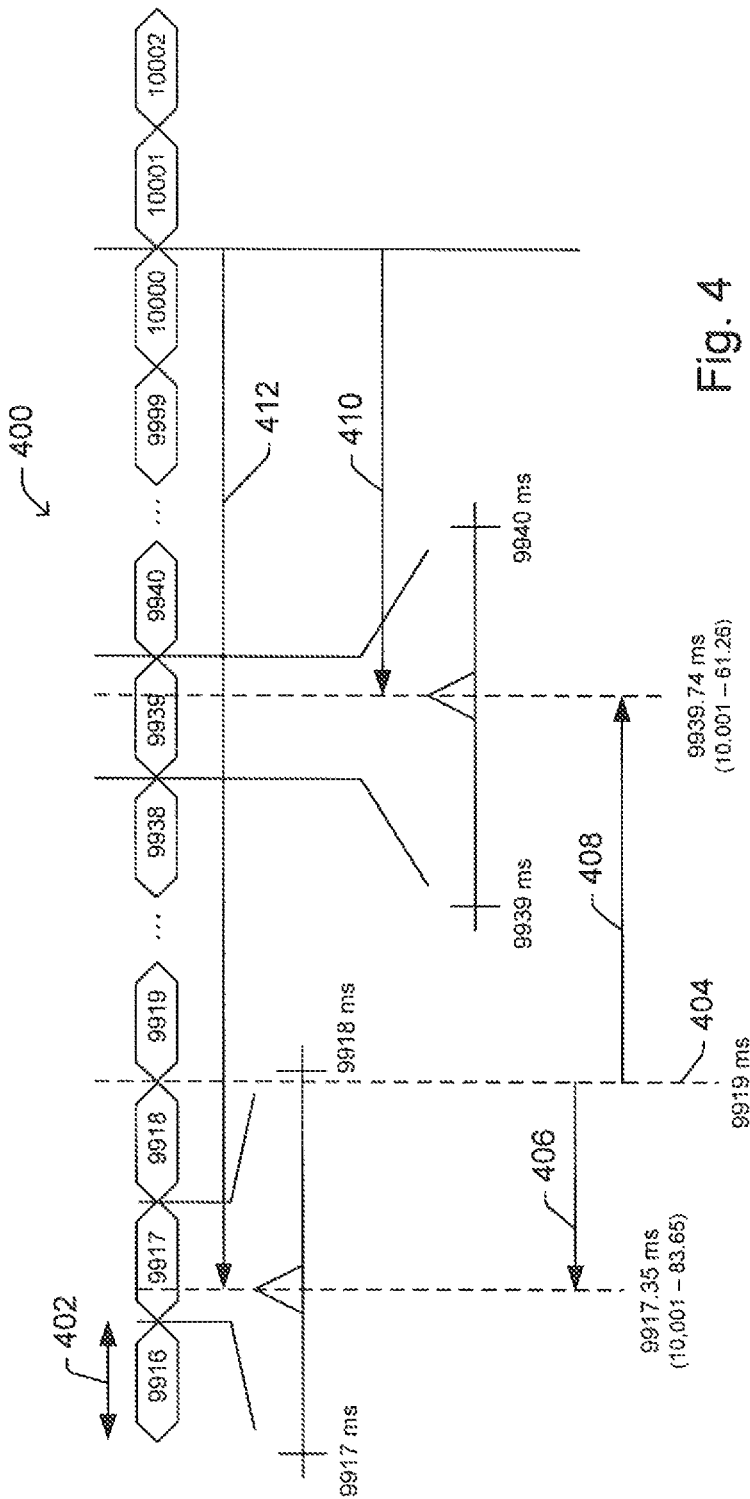
FIG. 4 is an example timeline diagram illustrating encoding and decoding techniques using a code phase origin reference value as may be implemented to support the sharing of acquisition assistance information as part of a position determination process, in accordance with an implementation.
Figure 5:
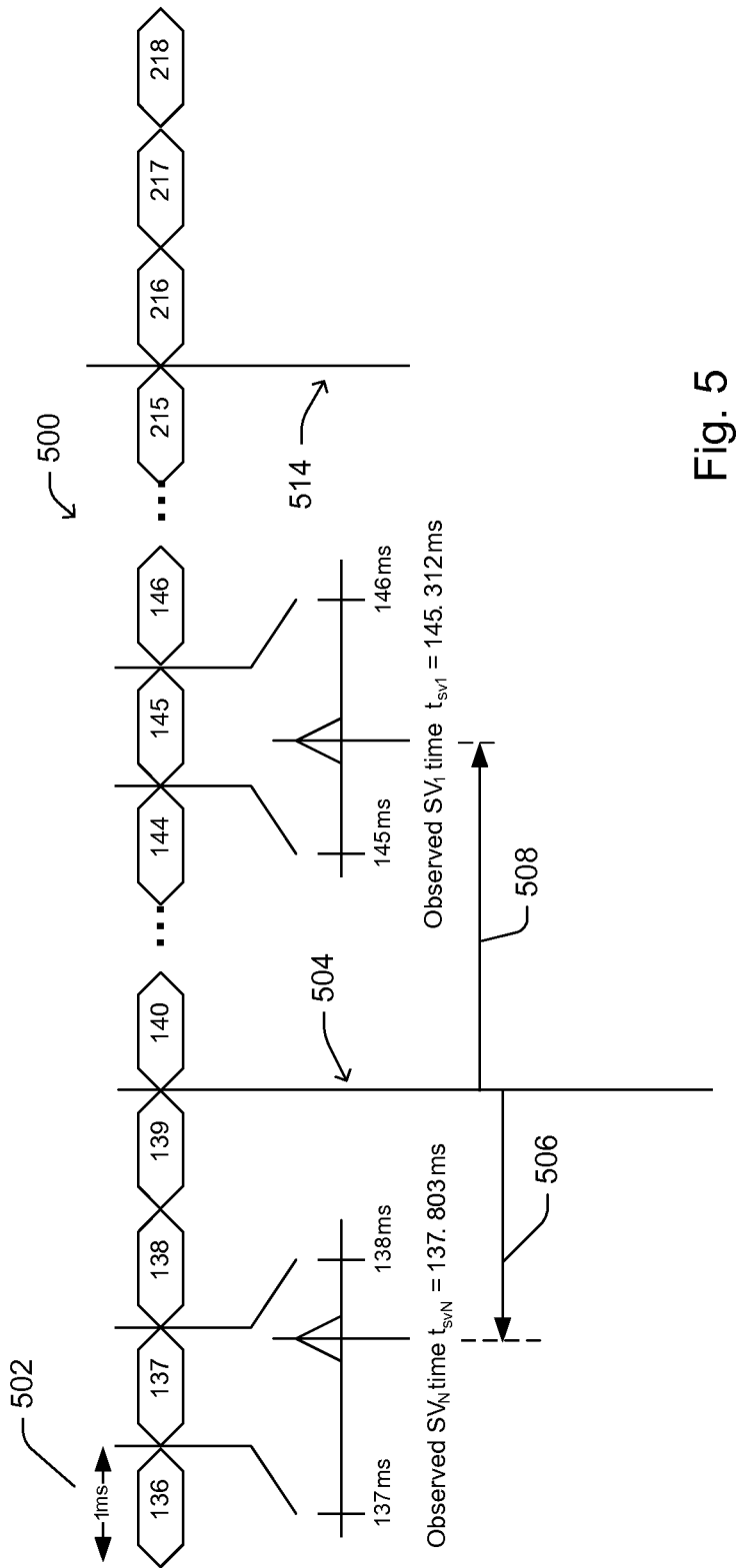
FIG. 5 is an example timeline diagram illustrating encoding and decoding techniques using a code phase origin reference value as may be implemented to support the sharing of pseudorange measurement information as part of a position determination process, in accordance with an implementation.

Thus, for example, apparatus 200 may be implemented in location server 110 (FIG. 1), which may provide acquisition assistance information to MS 102. Here, for example, all or portions of acquisition assistance information 242 may be requested by and/or otherwise provided to MS 102 via one or more messages 112 (see FIG. 1). Acquisition assistance information 242 may be associated with one or more SPS/GNSS resources. Acquisition assistance information 242 may include code phase values 234 that may be associated (e.g., measured or otherwise related in some manner) to one or more different reference time values 238. For example, acquisition assistance information 242 may include code phase values associated with an SPS, GNSS, CDMA, and/or other like time reference. As illustrated in FIGS. 3-5, and further described in greater detail below, apparatus 200 may also establish a "generic" code phase origin reference value 230 and based, at least in part thereon, further establish encoded code phase values 236. For example, processing unit 202 may include a signal processing unit or the like that may access and process code phase values 234 to establish "generic" code phase origin reference value 230. Processing unit 202 may then establish encoded code phase values 236 corresponding to code phase values 234 based, at least in part, on the "generic" code phase origin reference value 230. As used herein, the term "generic" implies that the established code phase origin reference value 230 is used for all or at least a plurality of encoded code phase values that may be included in the one or more messages that are transmitted/received and may be based, at least in part, on the corresponding code phase values.

An apparatus 200 may be implemented in mobile station 102 (FIG. 1), which may request/receive acquisition assistance information from a location server. Here, for example, all or portions of acquisition assistance information 242 may be received by MS 102 via one or more messages 112 (see FIG. 1). For example, encoded code phase values 236 and a "generic" code phase origin reference value 230 may be received. Processing unit 202 may "re-establish" code phase values 234 corresponding to encoded code phase values 236 based, at least in part, on the "generic" code phase origin reference value 230.

If apparatus 200 is implemented in MS 102, for example, then SPS receiver 240 may receive SPS signals associated with one or more SPS/GNSS resources, and more particularly to attempt to receive and acquire certain GNSS signals based, at least in part, on acquisition assistance information 242 as received from a location server.

In other examples, apparatus 200 may be implemented in mobile station 102 (FIG. 1), which may provide pseudorange measurement information to location server 110. Here, for example, all or portions of pseudorange measurement information 244 may be requested by and/or otherwise provided to location server 110 via one or more messages 112 (see FIG. 1). Pseudorange measurement information 244 may be associated with one or more SPS/GNSS resources and established, for example, by SPS receiver 240. Pseudorange measurement information 244 may include code phase values 234 that may be associated (e.g., measured or otherwise related in some manner) to one or more different reference time values 238. For example, pseudorange measurement information 244 may include code phase values associated with a time reference of an SPS, GNSS, CDMA, local MS time, and/or the like. As illustrated in FIGS. 3, 6 and 7, and further described in greater detail below, apparatus 200 may also establish a "generic" code phase origin reference value 230 and based, at least in part thereon, further establish encoded code phase values 236. For example, processing unit 202 may include a signal processing unit or the like that may access and process code phase values 234 to establish "generic" code phase origin reference value 230. Processing unit 202 may then establish encoded code phase values 236 corresponding to code phase values 234 based, at least in part, on the "generic" code phase origin reference value 230.

An example apparatus 200 may be implemented in location server 110 (FIG. 1), which may request/receive pseudorange measurement information from a mobile station. Here, for example, all or portions of pseudorange measurement information 244 may be received by location server 110 via one or more messages 112 (see FIG. 1). For example, encoded code phase values 236 and a "generic" code phase origin reference value 230 may be received. Processing unit 202 may "re-establish" code phase values 234 corresponding to encoded code phase values 236 based, at least in part, on the "generic" code phase origin reference value 230. As is well known, pseudorange measurements from a mobile station may be used by a location server to further assist in various position determination processes.

Transceiver 210 may, for example, include a transmitter 212 enabled to transmit one or more electromagnetic signals over one or more wireless communication links and a receiver 214 to receive one or more signals transmitted over one or more wireless communication links. In certain implementations, transceiver 210 may also support wired transmission and/or reception, e.g., if implemented within BS 104, location server 110, and/or other like devices.

Attention is drawn next to FIG. 3, which is a flow-diagram illustrating an exemplary method 300 that may be implemented in wireless communication network environment 100 to support a position determination process and more particularly, to support devices in requesting and providing code phase related information signals.

At block 302, a "generic" code phase origin reference value may be established, for example, based on a plurality of code phase values associated with one or more SPS/GNSS resource(s). At block 304, a plurality of encoded code phase values corresponding to the plurality of code phase values may be established, for example, using the "generic" code phase origin reference value.

At block 306, one or more messages with one or more encoded code phase value(s) and the code phase origin reference value may be sent through a wireless communication network to a receiving device. Here, for example, a location server may send one or more PDDM(s) (e.g., a Provide GNSS Acquisition Assistance PDDM, or the like) to a mobile station. Here, for example, a mobile station may send one or more PDDM(s) (e.g., a Provide GNSS Pseudorange Measurement PDDM, or the like) to a location server.

At block 308, a receiving device may establish/re-establish one or more code phase value(s) associated with the applicable SPS/GNSS resource(s) using the one or more received encoded code phase value(s) and "generic" code phase origin reference value. Thus, for example, a location server may receive a Provide GNSS Pseudorange Measurement PDDM, or the like, that was sent from a mobile station. The location server may then establish each of the plurality of code phase values by subtracting the "generic" code phase origin reference value and a corresponding one of the plurality of encoded code phase values from a reference time value. In other examples, a mobile station may receive a Provide GNSS Acquisition Assistance PDDM, or the like, that was sent from a location server. The mobile station may then establish each of the plurality of code phase values by subtracting the "generic" code phase origin reference value and a corresponding one of the plurality of encoded code phase values from a reference time value.

Attention is drawn next to Table 1 (below), which illustrates certain information that may be included in an example Provide GNSS Acquisition Assistance PDDM.

TABLE 1

| Information Element Name | Type | Multi | Presence |
|---|---|---|---|
| Part number | Integer(1 ... 16) | | |
| Total number of parts | Integer(1 ... 16) | | |
| Global information record | | | Optional |
| >Reference time | Integer(0 ... 604799999) | | |
| >Time reference source | Integer(0 ... 15) | | Optional |
| >Reference time uncertainty | Integer(0 ... 127) | | Optional |
| >Clock information | | | Optional |
| >>Clock bias | Integer(−31 ... 480) | | |
| >>Standard deviation of clock bias error | Bit String(5) | | |
| >>CHOICE Reference base station identifier | | | |
| >>>1x_HRPD | | | |
| >>>>Pilot PN sequence offset | Integer(0 ... 511) | | |
| >>>UMB | | | |
| >>>>Pilot ID | Bit String(16) | | |
| >Code phase origin | Integer(0 ... 127) | | |
| GNSS information record | | 1 to <maxNUM_GNSS> | |
| >GNSS identifier | Integer(1 ... 16) | | |
| >GNSS signal record | | 1 to <maxNUM_SIG> | |
| >>GNSS signal identifier | Integer (1 ... 8) | | Optional |
| >>Satellite information record | | 1 to <maxNUM_SAT> | |
| >>>GNSS satellite ID number | Integer(0 ... 63) | | |
| >>>Code phase | Integer(−65536 ... 65535) | | |
| >>>Code phase window | Integer(0 ... 31) | | |
| >>>0$^{th}$ order Doppler | Integer(−2048 ... 2047) | | |
| >>>1$^{st}$ order Doppler | Integer(−1024 ... 1023) | | Optional |
| >>>Doppler search window | Integer(0 ... 4) | | Optional |
| >>>AZ-El information | | | Optional |
| >>>>Azimuth of the satellite | Integer(0 ... 511) | | |
| >>>>Elevation angle of the satellite | Integer(0 ... 127) | | |
| >>>Satellite health indicator | Bit String(8) | | Optional |
| >>>GNSS signals available | Bit String(8) | | Optional |
| >>>Choice GNSS specific fields | | | Optional |
| >>>>GNSS_identifier_1 | | | |
| >>>>>L2C mode | Bit String(2) | | Optional |
| >>>>GNSS_identifier_4 | | | |
| >>>>>Channel number | Integer(−7 ... 13) | | Optional |

As illustrated in Table 1, in accordance with certain example implementations, a part number may be included to specify the part number of the GNSS Acquisition Assistance data. Also, a total number of parts may be included specifying the total number of parts that the GNSS Acquisition Assistance data is divided into. A global information record may be included (optional in this example). Here, for example, if the part number is set to '1' then a location server may include this field. Otherwise, if this field is absent, a mobile station may use the same global information record as it used in processing a previous part of this response element. A reference time may be included (e.g., as an integer (0 ... 604799999) with a scale factor of 1 ms). Here, for example, a location server may set this field to (t mod 604,800,000), where t is a reference time in units of 1 ms, valid for this part of the response element, based on a time reference specified by a 'time reference source'.

A 'time reference source' may be included (optional in this example) to indicate the type of time reference for which the acquisition assistance is valid in this part of the response element. By way of example, in certain implementations, a '0' value may indicate a CDMA time reference, a '1' value may indicate a GPS time reference, a '2' value may indicate a QZSS time reference, a '3' value may indicate a GLONASS time reference, a '4' value may indicate a Galileo time reference, a '5' value may indicate a Compass/BeiDou time reference, etc. In certain implementations, the time reference source value may be optional. For example, if absent then the "time reference source" may be considered to be a CDMA time reference.

A reference time uncertainty may be included (optional in this example) to indicate a single-sided uncertainty of the reference time field. Here, for example, an uncertainty r in microseconds may be calculated as follows: $r=0.0022\times(((1+0.18)^K)-1)$, where K is the value given in the reference time uncertainty field in the range from 0 to 127. Thus, for example, a value of K=127 means any value of r higher than 2.961 seconds.

Clock information may be included (optional in this example) to specify, for example, a clock correction for GPS time. A clock bias may be included, for example, as an integer (−31 ... 480) with a scale factor of 0.5 μs. Here, for example, a location server may set this field to an estimated mobile station clock bias in units of 0.5 μs, in the range from −15.5 μs to +240 μs. The clock bias may, for example, be computed as true GPS time minus a mobile station time reference. It is noted here, that as part of a GPS fix, a computation yields an estimate of the discrepancy between the time specified by the local clock and true GPS time. Thus, this parameter may report such a discrepancy. One cause of this discrepancy may be the propagation delay from a transmitting base station to the mobile station, which in this computation will be positive. Accordingly, the range allowed for this parameter is not symmetric. Further, it is noted that a 'code phase window' may be included as part of a satellite information record to account for an uncertainty in an estimated mobile station location. Thus, clock information may provide additional information about the uncertainty of the mobile station time reference. Standard deviation of clock bias error information may also be included to identify an estimated standard deviation of the clock bias error.

As shown in Table 1, a reference base station identifier may be included for use with CDMA200 1X, HRPD, UMB base stations. For example, for a CDMA 1X or HRPD base station, a pilot PN sequence offset may be included and set to the PN sequence offset of a pilot of the base station for which the provided 'Clock bias' is valid, relative to the zero offset pilot PN sequence, in units of 64 PN chips, in the range from 0 PN chips to 32,704 PN chips. For example, for a UMB base station a pilot ID may be included and set to the Pilot ID of the base station for which the provided 'Clock bias' is valid.

As shown in Table 1, a ("generic") code phase origin reference value may be included, which in this example, may be specified as an integer (e.g., between 0 and 127). In this example, the code phase origin reference value may have a scale factor (e.g., 1 ms). Thus, by way of example but not limitation, a location server in this example may set this field to the origin of the code phase values included in the GNSS information record provided in this part of the response element in the range from 0 to 127 ms. Hence, in certain implementations, a receiving mobile station may establish a reference epoch in ms for the provided code phase values by subtracting the value of the code phase origin in ms from the provided reference time field in ms.

As shown in Table 1, GNSS information record may be included for 1 to a maximum number of GNSS (maxNUM_GNSS). In this example, this field may identify the GNSS for which acquisition assistance parameters are included in this response element. A mapping of some example GNSS identifier values to SPS/GNSS resources is shown in Table 2 (below).

TABLE 2

| GNSS identifier value | GNSS | GNSS signal identifier; integer value | | | | | | | |
|---|---|---|---|---|---|---|---|---|---|
| | | '1' | '2' | '3' | '4' | '5' | '6' | '7' | '8' |
| | | GNSS signal identifier; bit string value | | | | | | | |
| | | Bit 1 (LSB) | Bit 2 | Bit 3 | Bit 4 | Bit 5 | Bit 6 | Bit 7 | Bit 8 (MSB) |
| '1' | GPS | L1 C/A | L1C | L2C | L5 | — | — | — | — |
| '2' | SBAS | L1 C/A | — | — | — | — | — | — | — |
| '3' | QZSS | L1 C/A | L1C | L2C | L5 | — | — | — | — |
| '4' | GLONASS | G1 | G2 | G3 | — | — | — | — | — |
| '5' | Galileo | E1 | E5a | E5b | E5a + E5b | E6 | — | — | — |
| '6' | Compass/BeiDou | B1 | B1-2 | B2 | B3 | — | — | — | — |
| '7' to '16' | Reserved for future GNSS | — | — | — | — | — | — | — | — |

TABLE 3

| GNSS identifier value | GNSS | GNSS satellite ID number value | Interpretation of GNSS satellite ID number |
|---|---|---|---|
| '1' | GPS | '0'-'62' | Satellite PRN Signal No. 1 to 63. |
| | | '63' | Reserved. |
| '2' | SBAS | '0'-'38' | Satellite PRN Signal No. 120 to 158. |
| | | '39'-'63' | Reserved. |
| '3' | QZSS | '0'-'4' | Satellite PRN Signal No. 193-197. |
| | | '5'-'63' | Reserved. |
| '4' | GLONASS | '0'-'23' | Slot Number 1 to 24. |
| | | '24'-'63' | Reserved. |
| '5' | Galileo | Not Specified | Not Specified |
| '6' | Compass/BeiDou | Not Specified | Not Specified |
| '7' to '16' | Reserved for future GNSS | — | — |

As shown in Table 1, a (encoded) code phase value may be included. By way of example but not limitation, an "encoded" code phase value may be specified as an integer (e.g., between −65536 and 65535) with a scale factor of: $2^{-10}$ ms. Here, for example, a location server may set this field to a predicted code phase observable relative to a time indicated by Code phase origin in units of $2^{-10}$ ms, in the range from −64 to $(64-2^{-10})$ ms scaled by a nominal chipping rate of the GNSS signal. Hence, for example, a receiving mobile station may then establish (re-establish) a corresponding (expected) code In certain implementations, a GNSS signal identifier element may be included and used to identify a GNSS signal for a GNSS as identified by "GNSS identifier" for which acquisition assistance information signals are provided. An exemplary mapping of GNSS signal identifier to some example GNSS signals is shown in Table 2. This element may be optional in certain implementation; thus, e.g., if absent a location server or other like device may select a GNSS signal corresponding to the integer value '1', for example, in accordance with Table 2.

As shown in Table 1, a satellite information record may be included to specify up to a maximum number (maxNUM_SAT) of satellites (e.g., SVs). A GNSS satellite ID number may be included and set to the value of the satellite ID number of the GNSS identified by GNSS identifier for which the satellite information is valid, for example, as specified in Table 3 (below).

phase in chips as follows: ('Reference time'−'Code phase origin'−'Code phase')×$10^{-3}$×nominal chipping rate of the assisted signal.

A code phase window may also be included and set to represent a total size of a two-sided symmetric code phase search window, for example, as shown in Table 4 (below).

TABLE 4

| Code phase window Value | Code Phase Search Window [milli seconds] |
|---|---|
| '0' | undefined |
| '1' | 0.001 |
| '2' | 0.002 |
| '3' | 0.003 |
| '4' | 0.004 |
| '5' | 0.005 |
| '6' | 0.006 |
| '7' | 0.008 |

TABLE 4-continued

| Code phase window Value | Code Phase Search Window [milli seconds] |
|---|---|
| '8' | 0.010 |
| '9' | 0.012 |
| '10' | 0.014 |
| '11' | 0.018 |
| '12 | 0.022 |
| '13 | 0.026 |
| '14 | 0.030 |
| '15' | 0.038 |
| '16' | 0.046 |
| '17' | 0.054 |
| '18' | 0.062 |
| '19' | 0.078 |
| '20' | 0.094 |
| '21' | 0.110 |
| '22' | 0.126 |
| '23' | 0.158 |
| '24' | 0.190 |
| '25' | 0.222 |
| '26' | 0.254 |
| '27' | 0.318 |
| '28' | 0.382 |
| '29' | 0.446 |
| '30' | 0.512 |
| '31' | 0.640 |

A $0^{th}$ order Doppler may also be included and set, for example, to a value of the $0^{th}$ order Doppler, in units of 0.5 m/s, in the range from −1024 m/s to +1023.5 m/s. Here, for example, conversion between m/s and Hz may be made by using a nominal wavelength of the assisted signal.

A $1^{st}$ order Doppler may also be included (optional in this example) and have a scale factor of 0.0002 m/s². Here, for example, a location server may set this field to a value of the $1^{st}$ order Doppler, in units of 0.0002 m/s², in a range from −0.2048 m/s² to 0.2047 m/s². Here too, conversion between m/s² and Hz/s may be made by using a nominal wavelength of the assisted signal.

A Doppler search window may be included (optional in this example) and set to represent a total size of a two-sided symmetric Doppler search window, for example, as shown in Table 5 (below).

TABLE 5

| Doppler search window Value | Doppler Search Window [m/s] |
|---|---|
| '0' | 40 |
| '1' | 20 |
| '2' | 10 |
| '3' | 5 |
| '4' | 2.5 |

As shown in Table 1, Azimuth-Elevation (AZ-El) information may be included, for example, to identify an azimuth and elevation of a satellite (SV). Here, for example, a location server may identify an azimuth of a satellite, in units of 0.703125 degrees, in the range from 0 to 359.296875 degrees, where 0 degrees is True North and the angle increases toward the East. Here, for example, a location server may identify an elevation angle of a satellite, in units of 0.703125 degrees, in the range from 0 to 89.296875 degrees.

A satellite health indicator may be included (optional in this example) to identify a GNSS signal for a GNSS as identified by 'GNSS identifier'. This field may, for example, include 8 bits, each of the LSB's representing one GNSS signal, e.g., as specified in exemplary Table 2. If a satellite signal corresponding to this 'GNSS satellite ID number' may be useable for position computation, the location server may set the corresponding bit to '1', otherwise the corresponding bit may be set to '0'. Bits for which no signal is defined in Table 2 may be set to '0'.

A GNSS signals available field may be included (optional in this example), which, for example may have 8 bits, with each of the LSBs representing one signal for the GNSS identified by 'GNSS identifier', as specified in Table 2. If a satellite transmits ranging signals represented by a bit of this field, then the location server may set that bit to '1'; otherwise, the bit may be set to '0'.

As shown in Table 1, various optional GNSS specific fields may be included. For example, a "GNSS_identifier_1" may be included if the 'GNSS identifier' field is set to '1' (e.g., GPS). A L2C mode may be included to indicate a type of modulation used by a satellite on the GPS L2 frequency, for example, as shown in Table 6 (below).

TABLE 6

| L2C_MODE Value (binary) | L2C Modulation Format |
|---|---|
| '00' | No data modulation |
| '01' | C/A navigation message bits |
| '10' | CNAV navigation message bits |
| '11' | Reserved |

A "GNSS_identifier_4" may be included, for example, if the 'GNSS identifier' field is set to '4' (e.g., GLONASS). A channel number may be included to indicate a GLONASS carrier frequency number of a satellite indicated by the 'GNSS ID number' field.

Attention is drawn next to Table 7 (below), which illustrates certain information that may be included in an example Provide GNSS Pseudorange Measurement PDDM.

TABLE 7

| Information Element Name | Type | Multi | Presence |
|---|---|---|---|
| Part number | Integer(1 . . . 16) | | |
| Total number of parts | Integer(1 . . . 16) | | |
| Global information record | | | Optional |
| >Reference time | Integer(0 . . . 14399999) | | |
| >Time reference source | Integer(0 . . . 15) | | |
| >Reference time uncertainty | Integer(0 . . . 127) | | Optional |
| >Code phase origin | Integer(0 . . . 127) | | |
| Pseudorange information | | 1 to <maxNUM_GNSS> | |
| >GNSS identifier | Integer(1 . . . 16) | | |
| >Satellite measurement record | | 1 to <maxNUM_SIG> | |

TABLE 7-continued

| Information Element Name | Type | Multi | Presence |
| --- | --- | --- | --- |
| >>GNSS signal identifier | Integer(1 ... 8) | | |
| >>Measurement parameters | | 1 to <maxNUM_SAT> | |
| >>>GNSS satellite ID number | Integer(0 ... 63) | | |
| >>>Channel number | Integer(−7 ... 13) | | Optional |
| >>>Code phase | Integer(−134217728 ... 134217727) | | |
| >>>Pseudorange measurement error indicator | Bit String(7) | | Optional |
| >>>Pseudorange RMS error | Bit String(6) | | |
| >>>Satellite pseudodoppler | Integer(−32768 ... 32767) | | |
| >>>Satellite pseudodoppler RMS error | Bit String(6) | | Optional |
| >>>Satellite C/N$_0$ | Integer(0 ... 63) | | |
| >>>Estimated pseudorange false alarm probability | Integer(0 ... 3) | | Optional |
| >>>Pseudorange false alarm range | Integer(0 ... 3) | | Optional |
| >>>Carrier phase measurement information | | | Optional |
| >>>>Accumulated delta range | Integer(0 ... 33554431) | | |
| >>>>Carrier phase quality indicator | Bit String(2) | | |

As illustrated in Table 7, in accordance with certain example implementations, a part number may be included to specify the part number of the GNSS Pseudorange Measurement data. Also, a total number of parts may be included specifying the total number of parts that the GNSS Pseudorange Measurement data is divided into.

A global information record may be included. Here, for example, if the part number is set to '1' then a mobile station may include this field. Otherwise, if this field is absent, a location server may use the same global information record as it used in processing a previous part of this response element. A reference time may be included (e.g., as an integer (0 ... 14399999) with a scale factor of 1 ms). Here, for example, a mobile station may set this field to (t mod 14,400,000), where t is a reference time in units of 1 ms based on a time reference specified by a 'time reference source'.

A 'time reference source' may be included to indicate a type of time reference that was used in obtaining the measurements included in this response element part. By way of example, in certain implementations, a '0' value may indicate a CDMA time reference, a '1' value may indicate a GPS time reference, a '2' value may indicate a QZSS time reference, a '3' value may indicate a GLONASS time reference, a '4' value may indicate a Galileo time reference, a '5' value may indicate a Compass/BeiDou time reference, etc. In certain implementations, the time reference source value may be optional, for example, if absent then the "time reference source" may be considered to be a CDMA time reference.

A reference time uncertainty may be included (optional in this example) to indicate a single-sided uncertainty of the reference time field. Here, for example, an uncertainty r in microseconds may be calculated as follows: r=0.0022×(((1+ 0.18)$^K$)−1), where K is the value given in the reference time uncertainty field in the range from 0 to 127. Thus, for example, a value of K=127 means any value of r higher than 2.961 seconds.

As shown in Table 7, a ("generic") code phase origin reference value may be included, which in this example, may be specified as an integer (e.g., between 0 and 127). In this example, the code phase origin reference value may have a scale factor of 1 ms. As such, in certain implementations, a receiving location server may establish a reference epoch in ms for the provided code phase measurements by subtracting the value of the code phase origin in ms from the provided reference time field in ms.

As shown in Table 7, pseudorange information record may be included for 1 to a maximum number of GNSS (maxNUM_GNSS). In this example, this field may identify the GNSS for which pseudorange measurements are included in this response element. A mapping of some example GNSS identifier values to SPS/GNSS resources is shown in Table 2.

A satellite measurement record may be included for 1 to a maximum number of signals (maxNUM_SIG). A GNSS signal identifier may be included to identify a GNSS signal for a GNSS as identified by 'GNSS identifier' for which pseudorange measurements are included in this response element. An example mapping of 'GNSS signal identifier' to a specific GNSS signal for the GNSS identified by 'GNSS identifier' is shown in Table 2.

Measurement parameters may be included for 1 to a maximum number of satellites (SVs) (maxNUM_SAT). A GNSS satellite ID number may be included and set to the value of the satellite ID number of the GNSS identified by 'GNSS identifier' for which the pseudorange measurement is valid, for example, as shown in Table 3. A channel number may be included (optional in this example) and set to indicate a GLONASS carrier frequency number of the satellite indicated by "GNSS satellite ID number". This field is optional and may be present if "GNSS identifier" field is set to '4' (GLONASS).

A (encoded) code phase value may be included, for example, represented by an integer (e.g., between −134217728 and 134217727) with a scale factor of $2^{-21}$ ms. Here, for example, a mobile station may set this field to a measured code phase from the ("generic") code phase origin in a range from −64 to (64-$2^{-21}$) ms. A receiving location server may, for example, establish (re-establish) a corresponding code phase value in chips as follows: ('Reference time'−'Code phase origin'−'Code phase')×$10^{-3}$×nominal chipping rate of the measured signal.

As shown in Table 7, a pseudorange measurement error indicator may be included (optional in this example) and set to indicate the type of errors that may have affected the code phase measurement parameters included in this 'Pseudorange information' record. Here, for example, this field may include 7 bits, with each of the LSB's represents one error type. An example mapping of such bits is shown in Table 8 (below). Here, for example, if an error type may have occurred then the mobile station may set the corresponding bit to '1'; otherwise the mobile station may set the corresponding bit to '0'.

TABLE 8

| Pseudorange measurement error indicator Value | Pseudorange Measurement Error Type |
|---|---|
| Bit 1 (LSB) | Satellite cross-correlation |
| Bit 2 | Short multipath (less than 1.5 µs delay difference between paths) |
| Bit 3 | Long multipath (more than or equal to 1.5 µs delay difference between paths) |
| Bit 4 | Non-GNSS interference |
| Bits 5-7 | Reserved |

As shown in Table 7, a pseudorange RMS error may be included and set to an estimated pseudorange RMS error for an applicable satellite. Here, for example, a "floating-point" representation may be employed wherein the four most significant bits constitute the exponent and the two least significant bits constitute the mantissa, e.g., as illustrated in the example shown in Table 9 (below).

TABLE 9

| Exponent, X | Mantissa, Y | Index Value, $i = Y + 4 \times X$ | Floating-Point Value, $f_i$ | RMS Error in Pseudorange Measurement Value, σ [meters] |
|---|---|---|---|---|
| '0000' | '00' | 0 | 0.125 | α < 0.125 |
| '0000' | '01' | 1 | 0.1563 | 0.125 ≤ α < 0.1563 |
| X | Y | 2 ≤ i ≤ 61 | $(1 + Y/4) \times 2^{(X-3)}$ | $f_{i-1} \leq \alpha < f_i$ |
| '1111' | '10' | 62 | 6144 | 5120 ≤ α < 6144 |
| '1111' | '11' | 63 | Not applicable | 6144 ≤ α |

As shown in Table 7, a satellite pseudodoppler integer may be included and set to a value of a measured satellite pseudodoppler, for example, in units of 0.04 m/s, in the range from −1310.72 m/s to +1310.68 m/s.

A satellite pseudodoppler RMS error may be included (optional in this example) and set to an estimated pseudodoppler RMS error for the applicable satellite. Here, for example, a "floating-point" representation may be employed, wherein the four most significant bits constitute the exponent and the two least significant bits constitute the mantissa, e.g., as shown in Table 10 (below).

TABLE 10

| Exponent, X | Mantissa, Y | Index Value, $i = Y + 4 \times X$ | Floating-Point Value, $f_i$ | RMS Error in Pseudodoppler Measurement Value, α [m/s] |
|---|---|---|---|---|
| '0000' | '00' | 0 | 0.02 | σ < 0.02 |
| '0000' | '01' | 1 | 0.025 | 0.02 ≤ σ < 0.025 |
| X | Y | 2 ≤ i ≤ 61 | $0.02 \times (1 + Y/4) \times 2^X$ | $f_{i-1} \leq \sigma < f_i$ |
| '1111' | '10' | 62 | 983.04 | 819.20 ≤ σ < 983.04 |
| '1111' | '11' | 63 | Not applicable | 983.04 ≤ σ |

As shown in Table 7, a satellite $C/N_0$ may be included and set to a value of a satellite $C/N_0$, for example, in units of 1 dB-Hz, in the range from 0 dB-Hz to 63 dB-Hz. Here, for example, the value of the satellite $C/N_0$ may be referenced to an antenna connector and/or the like within a mobile station. If an active antenna is employed (e.g., one with a built-in amplifier, or filter, or both), then $C/N_0$ may be referenced to the antenna port prior to any amplifier or filter.

An estimated pseudorange false alarm probability may be included (optional in this example) and set to represent an estimated false alarm probability, e.g., the probability that the parameters returned in this satellite record resulted more from a measurement of noise then from a measurement of a true SPS signal. Table 11 (below) shows an example implementation for setting an estimated pseudorange false alarm probability.

TABLE 11

| PR_FALSE_ALARM_PROB Value (Binary) | Pseudorange False Alarm Probability, p |
|---|---|
| '00' | p < 0.005 |
| '01' | 0.005 ≤ p < 0.05 |
| '10' | 0.05 ≤ p |
| '11' | Not computable |

As shown in Table 7, a pseudorange false alarm range may be included (optional in this example) and set, for example according to Table 12 (below), to represent a size of a two-sided code phase search window, e.g., a range of satellite code phases, over which a false alarm may have occurred.

TABLE 12

| PR_FALSE_ALARM_RANGE Value (binary) | Pseudorange False Alarm Range, r (GPS C/A code chips) |
|---|---|
| '00' | r < 32 |
| '01' | 32 ≤ r < 256 |
| '10' | 256 ≤ r |
| '11' | Not computable |

As shown in Table 7, carrier phase measurement information may be included, which may include an accumulated delta range set to a measured accumulated delta range, e.g., in units of $2^{-10}$ meters and in a range from 0 to $(32{,}768 - 2^{-10})$ meters. A carrier phase quality indicator may be included and set to a quality of the carrier phase measurement. Here, for example, a LSB may indicate a data polarity. Thus, if the data from an applicable satellite is received inverted, the mobile station may set the LSB of this bit field to '1'. Conversely, if the data is not inverted, the mobile station may set the LSB to '0'. The MSB may indicate whether the accumulation of carrier phase has been continuous (e.g., without cycle slips) since a previous measurement report. If the carrier phase accumulation has been continuous, the mobile station may set the MSB to '1', otherwise the mobile station may set the MSB to '0'.

Attention is drawn next to FIG. 4, which is an illustrative timeline diagram showing an example encoding of code phase information that may be implemented to establish encoded code phase values in acquisition assistance information signals. Here, for example, a timeline 400 is shown with a resolution 402 of 1 ms. More specifically, in this example, a reference time is 10,001 ms as measured in multiples of 1 ms. Periods 9917 and 9939 are shown in expanded form to illustrate a relationship between two of a plurality of code phase values and encoded code phase values based, at least in part, on a code phase origin reference value.

Here, for example, based at least in part on a plurality of code phase values in the acquisition assistance information to be provided to a mobile station, a location server may establish a code phase origin reference value 404. Here, code phase origin reference value 404 has been set at 82 ms (e.g., 10,001− 9919 ms as measured in multiples of 1 ms). As illustrated at period 9917, a code phase value for $SV_i$ may be represented by an encoded code phase value 406 of 1.65 ms (e.g., using multiples of $2^{-10}$ ms and rounding $(1.65/2^{-10})=1690$). As illustrated in period 9939, a code phase value for $SV_j$ may be represented by an encoded code phase value 408 of −20.74 ms (e.g., using multiples of $2^{-10}$ ms and rounding (−20.74 ms/ $2^{-10}$)=−21,238). Such encoded code phase values and code phase origin reference value may then be transmitted to the mobile station.

The mobile station may then establish (re-establish) the code phase values (e.g., calculate the expected $SV_i$ and $SV_j$ code phase values (ranges)) as follows and illustrated in FIG. 4. For $SV_i$, an estimated range 412 may be established as "Reference time"−"Code phase origin reference value"−"(encoded) Code phase value for $SV_i$"×$2^{-10}$=10,001−82−1690×$2^{-10}$=9917.3496 ms. For $SV_j$, an estimated range 410 may be established as "Reference time"−"Code phase origin reference value"−"(encoded) Code phase value for $SV_j$"×$2^{-10}$=10,001−82−(−21238×$2^{-10}$)=9939.7402 ms.

Reference is made next to FIG. 5, which is an illustrative timeline diagram showing an example encoding of code phase information that may be implemented to establish encoded code phase values in pseudorange measurement information signals. Here, for example, a timeline 500 is shown with a resolution 502 of 1 ms. More specifically, in this example, for the mobile station a reference time 514 (e.g., MS measurement epoch) is 216 ms as measured in multiples of 1 ms. Periods 137 and 145 are shown in expanded form to illustrate a relationship between two of a plurality of code phase values and encoded code phase values based, at least in part, on a code phase origin reference value.

Here, for example, based at least in part on a plurality of code phase values in the pseudorange measurement information to be provided to a location server, the mobile station may establish a code phase origin reference value 504. In the illustrated example code phase origin reference value 504 has been set at 76 ms (e.g., 216−140 ms as measured in multiples of 1 ms).

As illustrated at period 137, a code phase value for $SV_N$ may be based on an observed $SV_N$ time $t_{svN}$=137.803 ms and have a corresponding encoded code phase value 506 of 2.197 ms or round$\{2.197/2^{-21}\}$=4607443. As illustrated at period 145, a code phase value for $SV_1$ may be based on an observed $SV_1$ time $t_{sv1}$=145.312 ms and a corresponding encoded code phase value 508 of −5.312 ms or round$\{-5.312/2^{-21}\}$=−11140071. Such encoded code phase values and code phase origin reference value may then be transmitted to the location server.

The location server may then establish (re-establish) the code phase values based at least on part on the encoded code phase values and code phase origin reference value. For example, observed $t_{sv1}$ may be "re-established" as ="Reference Time"−"Code phase origin reference value"−"(encoded) Code phase value"=216−76−(−11140071×$2^{-21}$)= 145.31199 ms. For example, observed $t_{svN}$ may be "re-established" as ="Reference Time"−"Code phase origin reference value"−"(encoded) Code phase value"=216−76−(4607443× $2^{-21}$)=137.80299 ms.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it may be intended that claimed subject matter not be limited to the particular examples disclosed, but that such claimed subject matter may also include all aspects falling within the scope of appended claims, and equivalents thereof.

What is claimed is:

1. A method for use in a wireless communication network, the method comprising:
   receiving at least one message comprising signals representing a plurality of first encoded code phase values associated with one or more satellite positioning system(s) (SPS(s)), the at least one message identifying a generic code phase origin reference value; and
   re-establishing a plurality of second code phase values corresponding to said plurality of first encoded code phase values based, at least in part, on said first plurality of encoded code phase values and said generic code phase origin reference value.

2. The method as recited in claim 1, wherein said at least one message comprises signals identifying a reference time value, and wherein establishing said plurality of second code phase values is based at least in part on said reference time value.

3. The method as recited in claim 1, wherein each of said plurality of second code phase values is established by subtracting said generic code phase origin reference value and a corresponding one of said plurality of first encoded code phase values from a reference time value.

4. The method as recited in claim 1, wherein said at least one message comprises acquisition assistance information signals sent by a location server to a mobile station.

5. The method of claim 4, further comprising receiving SPS signals, based at least in part on said acquisition assistance information signals.

6. The method as recited in claim 1, wherein said at least one message comprises pseudorange measurement information signals sent by a mobile station to a location server.

7. The method as recited in claim 1, wherein said at least one message comprises at least one Position Determination Data Message (PDDM).

8. The method as recited in claim 1, wherein said at least one SPS comprises at least one Global Navigation Satellite System (GNSS) and said at least one message comprises signals identifying said at least one GNSS and at least one GNSS resource associated with at least one of said plurality of encoded code phase values.

9. The method as recited in claim 8, wherein said GNSS resource comprises at least one of a GPS resource, an SBAS resource, a QZSS resource, a GLONASS resource, a Galileo resource, and/or a Compass/BeiDou resource.

10. The method as recited in claim 8, wherein said GNSS resource is associated with at least one of a GNSS signal, a GNSS signal band, and/or a space vehicle (SV).

11. A specific apparatus for use in a wireless communication network, the specific apparatus comprising:
    means for receiving at least one message comprising signals representing a plurality of first encoded code phase values associated with one or more satellite positioning system(s) (SPS(s)), the at least one message identifying a generic code phase origin reference value; and
    means for re-establishing a plurality of second code phase values corresponding to said plurality of first encoded code phase values based, at least in part, on said first plurality of encoded code phase values and said generic code phase origin reference value.

12. The specific apparatus as recited in claim 11, wherein said at least one message comprises signals identifying a reference time value, and wherein establishing said plurality of second code phase values is based at least in part on said reference time value.

13. The specific apparatus as recited in claim 11, wherein each of said plurality of second code phase values is established by subtracting said generic code phase origin reference value and a corresponding one of said plurality of first encoded code phase values from a reference time value.

14. The specific apparatus as recited in claim 11, wherein said at least one message comprises acquisition assistance information signals sent by a location server to a mobile station.

15. The specific apparatus as recited in claim 14, further comprising means for receiving SPS signals based at least in part on said acquisition assistance information signals.

16. The specific apparatus as recited in claim 11, wherein said at least one message comprises pseudorange measurement information signals sent by a mobile station to a location server.

17. The specific apparatus as recited in claim 11, wherein said at least one message comprises at least one Position Determination Data Message (PDDM).

18. The specific apparatus as recited in claim 11, wherein said at least one SPS comprises at least one Global Navigation Satellite System (GNSS) and said at least one message comprises signals identifying said at least one GNSS and at least one GNSS resource associated with at least one of said plurality of encoded code phase values.

19. The specific apparatus as recited in claim 18, wherein said GNSS resource comprises at least one of a GPS resource, an SBAS resource, a QZSS resource, a GLONASS resource, a Galileo resource, and/or a Compass/BeiDou resource.

20. The specific apparatus as recited in claim 18, wherein said GNSS resource is associated with at least one of a GNSS signal, a GNSS signal band, and/or a space vehicle (SV).

21. A specific apparatus for use in a wireless communication network, the specific apparatus comprising:
a receiver operatively enabled to receive at least one message comprising signals representing a plurality of first encoded code phase values associated with one or more satellite positioning system(s) (SPS(s)), the at least one message identifying a generic code phase origin reference value; and
a signal processor operatively enabled to re-establish a plurality of second code phase values corresponding to said plurality of first encoded code phase values based, at least in part, on said first plurality of encoded code phase values and said generic code phase origin reference value.

22. The specific apparatus as recited in claim 21, wherein said at least one message comprises signals identifying a reference time value, and wherein establishing said plurality of second code phase values is based at least in part on said reference time value.

23. The specific apparatus as recited in claim 21, wherein each of said plurality of second code phase values is established by subtracting said generic code phase origin reference value and a corresponding one of said plurality of first encoded code phase values from a reference time value.

24. The specific apparatus as recited in claim 21, wherein said at least one message comprises acquisition assistance information signals sent by a location server to a mobile station.

25. The specific apparatus as recited in claim 24, wherein the receiver is further configured to receive SPS signals, based at least in part on said acquisition assistance information signals.

26. The specific apparatus as recited in claim 21, wherein said at least one message comprises pseudorange measurement information signals sent by a mobile station to a location server.

27. The specific apparatus as recited in claim 21, wherein said at least one message comprises at least one Position Determination Data Message (PDDM).

28. The specific apparatus as recited in claim 21, wherein said at least one SPS comprises at least one Global Navigation Satellite System (GNSS) and said at least one message comprises signals identifying said at least one GNSS and at least one GNSS resource associated with at least one of said plurality of encoded code phase values.

29. The specific apparatus as recited in claim 28, wherein said GNSS resource comprises at least one of a GPS resource, an SBAS resource, a QZSS resource, a GLONASS resource, a Galileo resource, and/or a Compass/BeiDou resource.

30. The specific apparatus as recited in claim 28, wherein said GNSS resource is associated with at least one of a GNSS signal, a GNSS signal band, and/or a space vehicle (SV).

31. An article comprising: a non-transitory computer readable medium having computer implementable instructions stored thereon, which if implemented by one or more processing units in a specific apparatus operatively enable the specific apparatus to:
receive at least one message comprising signals representing a plurality of first encoded code phase values associated with one or more satellite positioning system(s) (SPS(s)), the at least one message identifying a generic code phase origin reference value; and
re-establish a plurality of second code phase values corresponding to said plurality of first encoded code phase values based, at least in part, on said first plurality of encoded code phase values and said generic code phase origin reference value.

32. The article as recited in claim 31, wherein said at least one message comprises signals identifying a reference time value, and wherein establishing said plurality of second code phase values is based at least in part on said reference time value.

33. The article as recited in claim 31, wherein each of said plurality of second code phase values is established by subtracting said generic code phase origin reference value and a corresponding one of said plurality of first encoded code phase values from a reference time value.

34. The article as recited in claim 31, wherein said at least one message comprises acquisition assistance information signals sent by a location server to a mobile station.

35. The article as recited in claim 34, wherein the computer implementable instructions if implemented by one or more processing units in a specific apparatus, further operatively enable said specific apparatus to receive SPS signals based at least in part on said acquisition assistance information signals.

36. The article as recited in claim 31, wherein said at least one message comprises pseudorange measurement information signals sent by a mobile station to a location server.

37. The article as recited in claim 31, wherein said at least one message comprises at least one Position Determination Data Message (PDDM).

38. The article as recited in claim 31, wherein said at least one SPS comprises at least one Global Navigation Satellite System (GNSS) and said at least one message comprises signals identifying said at least one GNSS and at least one GNSS resource associated with at least one of said plurality of encoded code phase values.

39. The article as recited in claim 38, wherein said GNSS resource comprises at least one of a GPS resource, an SBAS resource, a QZSS resource, a GLONASS resource, a Galileo resource, and/or a Compass/BeiDou resource.

40. The article as recited in claim 38, wherein said GNSS resource is associated with at least one of a GNSS signal, a GNSS signal band, and/or a space vehicle (SV).

* * * * *